United States Patent
Kerns et al.

(10) Patent No.: US 6,372,863 B1
(45) Date of Patent: Apr. 16, 2002

(54) SYNTHESIS OF STYRENE-BUTADIENE RUBBER

(75) Inventors: Michael Lester Kerns, Elyria; Zhengfang Xu, Stow; Scott McDowell Christian, Clinton, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 80 days.

(21) Appl. No.: 09/618,312

(22) Filed: Jul. 18, 2000

Related U.S. Application Data (60) Provisional application No. 60/148,640, filed on Aug. 12, 1999.

(51) Int. Cl.$^7$ .................................................. C08F 2/06
(52) U.S. Cl. ........................... 526/65; 526/82; 526/173; 526/335; 526/346; 525/250
(58) Field of Search .................... 526/65, 346, 335, 526/173, 82; 525/250

(56) References Cited

U.S. PATENT DOCUMENTS 4,835,209 A * 5/1989 Kitagawa et al. ........... 524/507

* cited by examiner

*Primary Examiner*—David W. Wu
*Assistant Examiner*—William Cheung
(74) *Attorney, Agent, or Firm*—Alvin T. Rockhill (57) ABSTRACT

This invention discloses a process for synthesizing random styrene-butadiene rubber comprising: (1) continuously charging 1,3-butadiene, styrene, an initiator, and a solvent into a first polymerization zone, (2) allowing the 1,3-butadiene and styrene to copolymerize in the first polymerization zone to total conversion of 60 to 90 percent to produce a polymer cement containing living styrene-butadiene chains, (3) continuously charging the polymer cement containing living styrene-butadiene chains and additional 1,3-butadiene monomer into a second polymerization zone, wherein from 20 to 40 percent of the total amount of 1,3-butadiene changed is charged into the second polymerization zone, (4) allowing the copolymerization to continue in the second polymerization zone to a conversion of the 1,3-butadiene monomer of at least 90 percent, wherein the total conversion of styrene and 1,3-butadiene in the second polymerization zone is limited to a maximum of 95 percent, (5) withdrawing a polymer cement of random styrene-butadiene rubber having living chain ends from the second reaction zone, (6) killing the living chain ends on the random styrene-butadiene rubber, and (7) recovering the random styrene-butadiene rubber from the polymer cement, wherein the copolymerizations in the first polymerization zone and the second polymerization zone are carried out at a temperature which is within the range of 70° C. to 100° C., and wherein the amount of styrene charged into the first polymerization zone is at least 5 percent more than the total amount of styrene bound into the rubber.

15 Claims, 1 Drawing Sheet

Figure 1

SYNTHESIS OF STYRENE-BUTADIENE RUBBER

"This application claims the benefit of U.S. Provisional Application Ser. No. 60/148,640 filed on Aug. 12, 1999."

BACKGROUND OF THE INVENTION

It is desirable for a tire to exhibit good traction characteristics on wet and dry pavements, and for the tire to provide good treadwear and low rolling resistance. In order to reduce the rolling resistance of a tire, rubbers having a high rebound can be utilized in making the tires' tread. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber (SBR), polybutadiene rubber, and natural rubber are commonly used in automobile tire treads formulations. Styrene-butadiene rubber is included in tire tread formulations primarily to improve the traction characteristics of the tire without greatly compromising tread-wear or rolling resistance.

The versatility of solution SBR (SSBR) synthesis relative to the synthesis of emulsion (ESBR), including control of molecular weight, macrostructure, microstructure, and functionalization, is well established (see Hirao, A.; Hayashi, M. Acta. Polym. 1999, 50, 219–231, and references cited therein). Performance advantages arising from this versatility have led to an acceleration of the replacement of emulsion SBR in the tire industry, and an expansion in the market for random, low vinyl SBR for use in tire compounds (see Autcher, J. F.; Schellenberg, T.; Naoko, T. "Styrene-Butadiene Elastomers (SBR)," Chemical Economics Handbook, SRI-International, November, 1997). These developments have stimulated interest in developing technology for commercial production of random, low vinyl solution SBR.

Although anionic initiated synthesis of random medium vinyl solution SBR and random high vinyl solution SBR is easily accomplished by the addition of Lewis bases, these polar modifiers promote randomization at the expense of increased vinyl content (see Antkowiak, T. A.; Oberster, A. E.; Halasa, A. F.; Tate, D. P. J. Polym. Sci., Part A-1, 1972, 10, 1319). Due to the large differences in monomer reactivity ratios of butadiene and styrene, measures must be taken to promote random incorporation of styrene into low vinyl solution SBR. In the absence of such measures, the polymerization leads to a tapered block copolymer with inferior elastomeric performance characteristics (see U.S. Pat. No. 3,558,575).

British Patent 994,726 reports that it is possible to produce random solution SBR by manipulating monomer polymerization rates via control of monomer concentrations throughout the polymerization process without the use of polar modifiers. For solution SBR, this requires that the polymerization proceed in a styrene rich medium throughout the polymerization. In continuous polymerizations the issues associated with maintaining constant monomer concentration ratios while increasing conversion become quite complex.

U.S. Pat. No. 3,787,377 reports that alkali metal alkoxides (NaOR) can be used as polar modifiers in the copolymerization of styrene and butadiene to randomize styrene incorporation without significantly increasing the vinyl content of the rubber. However, alkali metal alkoxide modifiers are so effective that they may actually increase the rate of polymerization of styrene to the extent that it is depleted before the polymerization is complete (see Hsieh, H. L.; Wofford, C. F. J. Polym. Sci., Part A-1, 1969, 7, 461–469). Furthermore, there is typically some undesired increase in vinyl content over what would be expected from an unmodified polymerization (see Hsieh, H. L.; Wofford, C. F. J. Polym. Sci., Part A-1, 1969, 7, 449–460).

SUMMARY OF THE INVENTION

A method to prevent the formation of tapered block solution SBR in unmodified polymerizations using standard continuous stirred tank reactors (CSTRs) has been developed. This method involves charging all of the styrene and part of the 1,3-butadiene being polymerized into a first polymerization zone. The first polymerization zone is typically a continuous stirred tank reactor. The amount of styrene charged into the first polymerization zone will typically be at least 5 percent more than the amount of styrene bound into the styrene-butadiene rubber being synthesized. It is important for a conversion within the range of about 60 percent to about 90 percent to be attained in the first polymerization zone. Additional 1,3-butadiene monomer is charged into a second polymerization zone, such as a second continuous stirred tank reactor. Typically from about 20 percent to about 40 percent of the total amount 1,3-butadiene charged will be charged into the second polymerization zone. It is also important for a 1,3-butadiene conversion of at least about 90 percent to be attained in the second polymerization zone and for the total conversion (styrene and 1,3-butadiene) to be limited to a maximum of about 95 percent in the second polymerization zone.

This invention more specifically discloses a process of synthesizing random styrene-butadiene rubber having a low level of branching and a low vinyl content which comprises: (1) continuously charging 1,3-butadiene, styrene, an alkyl lithium initiator, and an organic solvent into a first polymerization zone, (2) allowing the 1,3-butadiene and styrene to copolymerize in the first polymerization zone to total conversion which is within the range of about 60 percent to about 90 percent to produce a polymer cement containing living styrene-butadiene chains, (3) continuously charging the polymer cement containing living styrene-butadiene chains and additional 1,3-butadiene monomer into a second polymerization zone, wherein from 20 percent to 40 percent of the total amount of 1,3-butadiene changed is charged into the second polymerization zone, (4) allowing the copolymerization to continue in the second polymerization zone to a conversion of the 1,3-butadiene monomer of at least 90 percent, wherein the total conversion of styrene and 1,3-butadiene in the second polymerization zone is limited to a maximum of 95 percent, (5) withdrawing a polymer cement of random styrene-butadiene rubber having living chain ends from the second reaction zone, (6) killing the living chain ends on the random styrene-butadiene rubber, and (7) recovering the random styrene-butadiene rubber from the polymer cement, wherein the copolymerizations in the first polymerization zone and the second polymerization zone are carried out at a temperature which is within the range of about 70° C. to about 100° C., and wherein the amount of styrene charged into the first polymerization zone is at least 5 percent more than the total amount of styrene bound into the random styrene-butadiene rubber. The living chain ends on the random styrene-butadiene rubber can optionally be killed by the addition of a coupling agent, such as tin tetrachloride.

The present invention also reveals a cement of living styrene-butadiene rubber which is comprised of an organic solvent and polymer chains that are derived from 1,3-butadiene and styrene, wherein the polymer chains are terminated with lithium end groups, wherein the polymer chains have a vinyl content of less than 10 percent, wherein less than 5 percent of the total quantity of repeat units derived from styrene in the polymer chains are in blocks containing five or more styrene repeat units, and wherein the molar amount of polar modifier in the cement of the living styrene-butadiene rubber is at a level of less than 20 percent of the number of moles of lithium end groups on the polymer chains of the living styrene-butadiene rubber. Such cements of living styrene-butadiene rubber made by the process of this invention can be easily coupled because they contain very low levels of polar modifiers.

DETAILED DESCRIPTION OF THE INVENTION

The polymerizations of the present invention are carried out continuously in a first polymerization zone, such as a first reactor, and a second polymerization zone, such as a second reactor. These copolymerizations of 1,3-butadiene and styrene are carried out in a hydrocarbon solvent which can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha and the like, alone or in admixture.

In the solution polymerizations of this invention, there will normally be from 5 to 30 weight percent monomers in the polymerization medium. Such polymerization media are, of course, comprised of the organic solvent, monomers, and an initiator. In most cases, it will be preferred for the polymerization medium to contain from 10 to 25 weight percent monomers. It is generally more preferred for the polymerization medium to contain 15 to 20 weight percent monomers.

In the polymerizations of this invention the styrene, 1,3-butadiene, solvent, and initiator are continuously charged into the first polymerization zone. All of the styrene and a portion of the 1,3-butadiene is charged into the first polymerization zone. The amount of styrene charged into the first polymerization zone is at least 5 percent more than the total amount of styrene bound into the random styrene-butadiene rubber being synthesized. In other words, at least 5 percent more styrene is charged into the first polymerization zone than will be polymerized during the polymerization in the first polymerization zone and second polymerization zone. It is preferred for the amount of styrene charged into the first polymerization zone to be at least 7 percent more than the total amount of styrene bound into the random styrene-butadiene rubber being synthesized. It is more preferred for the amount of styrene charged into the first polymerization zone to be at least 10 percent more than the total amount of styrene bound into the random styrene-butadiene rubber being synthesized.

The conversion attained in the first polymerization zone will be within the range of about 60 percent to about 90 percent. It is preferred for the conversion attained in the first polymerization zone will be within the range of about 75 percent to about 85 percent. The polymer cement containing living styrene-butadiene chains and additional 1,3-butadiene monomer made in the first polymerization zone is continuously charged into a second polymerization zone. About 20 percent to 40 percent of the total amount of 1,3-butadiene changed into the first polymerization zone and the second polymerization zone is charged into the second polymerization zone. Preferably from 25 percent to 35 percent of the total amount of 1,3-butadiene changed into the first polymerization zone and the second polymerization zone is charged into the second polymerization zone. Most preferably from 27 percent to 33 percent of the total amount of 1,3-butadiene changed into the first polymerization zone and the second polymerization zone is charged into the second polymerization zone.

It is critical for the total conversion (styrene and 1,3-butadiene) attained in the second polymerization zone to be held below about 95 percent and preferably below about 93 percent. However, the 1,3-butadiene will be polymerized in the second reaction zone to a conversion of at least about 90 percent. The 1,3-butadiene will preferably be polymerized in the second reaction zone to a conversion of at least about 95 percent and will most preferably be polymerized to a conversion of 98 percent.

The copolymerizations of styrene and butadiene in the first polymerization zone and the second polymerization zone will be maintained at a temperature which is within the range of about 70° C. to about 100° C. At temperatures below about 70° C. the polymerization is too slow to be commercially acceptable. On the other hand, at temperatures above 100° C. thermal induced branching occurs to the extent that it adversely affects the hysteretic properties of the styrene-butadiene rubber. For these reasons, the polymerization temperature will normally be maintained within the range of 75° C. to 85° C., and will preferably be maintained within the range of 80° C. to 90° C.

The styrene-butadiene rubber made utilizing the technique of this invention is comprised of repeat units which are derived from 1,3-butadiene and styrene. These styrene-butadiene rubbers will typically contain from about 5 weight percent to about 50 weight percent styrene and from about 50 weight percent to about 95 weight percent 1,3-butadiene. The styrene-butadiene rubber will more typically contain from about 10 weight percent to about 30 weight percent styrene and from about 70 weight percent to about 90 weight percent 1,3-butadiene. The styrene-butadiene rubber will preferably contain from about 15 weight percent to about 25 weight percent styrene and from about 75 weight percent to about 85 weight percent 1,3-butadiene.

In the styrene-butadiene rubbers of this invention, the distribution of repeat units derived from styrene and butadiene is essentially random. The term "random" as used herein means that less than 5 percent of the total quantity of repeat units derived from styrene are in blocks containing five or more styrene repeat units. In other words, more than 95 percent of the repeat units derived from styrene are in blocks containing less than five repeat units. A large quantity of repeat units derived from styrene will be in blocks containing only one styrene repeat unit. Such blocks containing one styrene repeat unit are bound on both sides by repeat units which are derived from 1,3-butadiene.

In styrene-butadiene rubbers containing less than about 30 weight percent bound styrene which are made with the catalyst system of this invention, less than 2 percent of the total quantity of repeat units derived from styrene are in blocks containing five or more styrene repeat units. In other words, more than 98 percent of the repeat units derived from styrene are in blocks containing less than five repeat units. In such styrene-butadiene rubbers, over 40 percent of repeat units derived from styrene will be in blocks containing only one styrene repeat unit, over 75 percent of the repeat units derived from styrene will be in blocks containing less than 3 repeat units and over 95 percent of the repeat units derived from styrene will be in blocks containing less than 4 repeat units. Normally less than 2 percent of the bound styrene in the styrene-butadiene rubber is in blocks of greater than 3 repeat units. Preferably less than 1 percent of the bound styrene in the styrene-butadiene rubber is in blocks of greater than 3 repeat units.

In styrene-butadiene rubbers containing less than about 20 weight percent bound styrene which are made with the catalyst system of this invention, less than 1 percent of the total quantity of repeat units derived from styrene are in blocks containing 4 or more styrene repeat units. In other words, more than 99 percent of the repeat units derived from styrene are in blocks containing less than 4 repeat units. In such styrene-butadiene rubbers, over 60 percent of repeat units derived from styrene will be in blocks containing only one styrene repeat unit and over 95 percent of the repeat units derived from styrene will be in blocks containing less than 3 repeat units. Normally less than 2 percent of the bound styrene in the styrene-butadiene rubber is in blocks of greater than 3 repeat units. Preferably less than 1 percent of the bound styrene in the styrene-butadiene rubber is in blocks of greater than 3 repeat units.

The styrene-butadiene copolymers of this invention also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-butadiene copolymers will typically contain no segments having a length of at least 100 repeat units which have a styrene content which differs from the total styrene content of the polymer by more than about 5 percent.

The polymerizations of this invention are initiated by adding an organolithium compound to the first polymerization zone containing the styrene and 1,3-butadiene monomers. The organolithium compounds which can be employed in the process of this invention include the monofunctional and multifunctional initiator types known for polymerizing the conjugated diolefin monomers. The multifunctional organolithium initiators can be either specific organolithium compounds or can be multifunctional types which are not necessarily specific compounds but rather represent reproducible compositions of regulable functionality.

The choice of initiator can be governed by the degree of branching and the degree of elasticity desired for the polymer, the nature of the feedstock and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate the activity of the organolithium compound, thus necessitating the presence of sufficient lithium functionality so as to override such effects.

The multifunctional organolithium compounds which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds. Exemplary organomonolithium compounds include ethyl lithium, isopropyl lithium, n-butyllithium, sec-butyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane and the like.

Exemplary multivinylphosphine compounds include trivinylphosphine, methyldivinylphosphine, dodecyldivinylphosphine, phenyldivinylphosphine, cyclooctyldivinylphosphine and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene and the like. Divinyl aromatic hydrocarbons containing up to 18 carbon atoms per molecule are preferred, particularly divinylbenzene as either the ortho, meta or para isomer, and commercial divinylbenzene, which is a mixture of the three isomers, and other compounds such as the ethyl styrenes, also is quite satisfactory.

Other types of multifunctional lithium compounds can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed, if desired.

Alternatively, specific organolithium compounds can be employed as initiators, if desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyl lithium, isopropyl lithium, n-butyllithium, sec-butyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl and the like. Some highly preferred functionalized organolithium initiators are N-lithiopiperidine and 3-pyrrolidine-1-propyllithium.

The organolithium compound will normally be present in the polymerization medium in an amount which is within the range of about 0.01 to 1 phm (parts by 100 parts by weight of monomer). In most cases, from 0.01 phm to 0.1 phm of the organolithium compound will be utilized with it being preferred to utilize from 0.025 phm to 0.07 phm of the organolithium compound in the polymerization medium.

Polar modifiers can be used to modify the microstructure of the rubbery polymer being synthesized. However, the amount of polar modifier employed should be limited to keep the vinyl content of the styrene-butadiene rubber being synthesized at a low level. Ethers and amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA, tetrahydrofuran, piperidine, pyridine and hexamethylimine are representative of highly preferred modifiers. U.S. Pat. No. 4,022,959 describes the use of ethers and tertiary amines as polar modifiers in greater detail.

After the polymerization has reached the desired level of conversion it is terminated using a standard technique. The polymerization can be terminated with a conventional non-coupling type of terminator (such as, water, an acid and/or a lower alcohol) or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl and the like. The divinylaromatic hydrocarbons are preferred, particularly divinylbenzene in either its ortho, meta or para isomer. Commercial divinylbenzene which is a mixture of the three isomers and other compounds is quite satisfactory.

While any multiepoxide can be used, liquids are preferred since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds, such as 1,2,5,6,9,10-triepoxydecane, also can be used.

Examples of suitable multiisocyanates include benzene-1,2,4-triisocyanate, naphthalene-1,2,5,7-tetraisocyanate and the like. Especially suitable is a commercially available product known as PAPI-1, a polyarylpolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing three or more aziridine rings per molecule. Examples of such compounds include the triaziridinyl phosphine oxides or sulfides such as tri(1-ariridinyl)phosphine oxide, tri(2-methyl-1-ariridinyl) phosphine oxide, tri(2-ethyl-3-decyl-1-ariridinyl)phosphine sulfide and the like.

The multialdehydes are represented by compounds such as 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones can be represented by compounds such as 1,4,9,10-anthraceneterone, 2,3-diacetonylcyclohexanone and the like. Examples of the multianhydrides include pyromellitic dianhydride, styrene-maleic anhydride copolymers and the like. Examples of the multiesters include diethyladipate, triethyl citrate, 1,3,5-tricarbethoxybenzene and the like.

The preferred multihalides are silicon tetrahalides (such as silicon tetrachloride, silicon tetrabromide and silicon tetraiodide) and the trihalosilanes (such as trifluorosilane, trichlorosilane, trichloroethylsilane, tribromobenzylsilane and the like). Also preferred are the multihalogen-substituted hydrocarbons (such as, 1,3,5-tri(bromomethyl) benzene and 2,4,6,9-tetrachloro-3,7-decadiene) in which the halogen is attached to a carbon atom which is alpha to an activating group such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione and the like.

In addition to the silicon multihalides as described hereinabove, other metal multihalides, particularly those of tin, lead or germanium, also can be readily employed as coupling and branching agents. Difunctional counterparts of these agents also can be employed, whereby a linear polymer rather than a branched polymer results. Monofunctional counterparts can be used to end cap the rubbery polymer. For instance, trialkyl tin chlorides, such as tri-isobutyl tin chloride, can be utilized to end cap the rubbery polymer.

Broadly, and exemplary, in the case of tetrafunctional coupling agents, such as tin tetrachloride, a range of about 0.01 to 1 moles of coupling agent are employed per mole of lithium in the initiator. To attain a maximum level of coupling, it is preferred to utilize about 0.1 to about 2.5 moles of the coupling agent per mole of lithium in the initiator. The larger quantities tend to result in production of polymers containing terminally reactive groups or insufficient coupling. The coupling agent can be added in hydrocarbon solution (e.g., in cyclohexane) to the polymerization admixture in the final reactor with suitable mixing for distribution and reaction.

After the copolymerization has been completed, the styrene-butadiene elastomer can be recovered from the organic solvent. The styrene-butadiene rubber can be recovered from the organic solvent and residue by means such as decantation, filtration, centrification and the like. It is often desirable to precipitate the segmented polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. After the segmented polymer is recovered from the solution, steam-stripping can be employed to reduce the level of volatile organic compounds in the rubber.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLES

In order to best evaluate different methodologies (split feed, alkali metal alkoxide modified, and unmodified), four target polymers were chosen with varying styrene levels and Mooney viscosity targets. The target polymers are listed in Table I along with the desired styrene, vinyl, and Moony $ML_{1+4}$ viscosity at 100° C. for each sample. For the purposes of these examples each sample type (1–4) will be further classified as being synthesized via Split Feed (a), Sodium t-amylate (STA) modification (b), or unmodified polymerization(c).

TABLE I

TARGETED LOW VINYL SSBR POLYMERS

| Sample Type | Styrene Target (wt %) | Vinyl Target (wt %) | Mooney Viscosity (ML 1 + 4 (100° C.)) |
|---|---|---|---|
| 1(a-c) | 18 | 10 | 40+/−5 |
| 2(a-c) | 25 | 10 | 40+/−5 |
| 3(a-c) | 30 | 10 | 40+/−5 |
| 4(a-c) | 25 | 10 | 45+/−5 OE (~110 base) |

All of the samples presented herein were prepared via anionic chain polymerization using n-butyllithium as the initiator except where noted. The polymers were prepared in a continuous two-reactor chain where each reactor was equipped with two axial flow turbines (AFTs) and baffles. The agitation speed was 200–250 rpm with the AFTs pumping down. The polymerizations were controlled through use of a Foxboro distributive control system. The polymerizations were terminated with rosin acid at a level of 1 phr, and Wingstay K® antioxidant was added at a level of 0.5 phr. In Sample Type 4, the highly aromatic oil (37.5 parts) was post added to the polymer cement before isolation by steam stripping, extruder dewatering, and oven drying.

Preparations

Styrene and 1,3-butadiene solutions were made up at 14 to 15 weight percent in hexanes (mixed hexane isomers) with 1,2-butadiene added for gel suppression at a level of 100–150 ppm (based on total monomer). The monomer solutions were purified by passing over molecular sieves and silica gel. The initiators, sodium alkoxide, rosin acid, and antioxidant were diluted with hexanes.

Analytical Testing

Reactor conversions were determined by gravimetric analysis. A Hewlett Packard 5890 Series II gas chromatograph was used for residual monomer analysis. Mooney viscosities ($ML_{1+4}$ (100° C.)) were measured on a Flexsys MV2000. Glass transition temperatures (onset on heat @ 10° C./min) were measured on a TA 2910 DSC. Molecular weights were measured by multi-angle light scattering (MALS) GPC. Microstructures were measured by FTIR (Nicolet 510) and proton NMR (Varian 300). Block styrene was determined by an ozonolysis procedure derived from a published procedure (see Tanaka, Y.; Sato, H.; Adachi, J. Rubber Chem. Technol. 1986, 59, 16). All polymers were evaluated in typical tread formulations with the experimental SSBR constituting 100% of the elastomeric ingredients. Carbon black loadings were 50 parts for the non-oil extended samples and 65 parts for the oil extended samples. Compound cures were optimized from rheometer data.

Split Feed SSBR Model and Preparation

The Split Feed samples were prepared by splitting the total 1,3-butadiene monomer feed stream into each reactor in a series of CSTRs (see Tirrell, M.; Galvin, R.; Laurence, R. L. In Polymerization Reactors in Chemical Reaction and Reactor Engineering; Carberry, J. J. and Varma, A, Eds.; Marcel Dekker, New York, 1987;and Saldivar, E. PhD Thesis; Modeling and Control of Emulsion Copolymerization Reactors, University of Wisconsin—Madison, 1996). The reactor model used to determine split ratios is based upon the first principal approach: the material and energy balance of each species in each reactor. For a two-reactor split feed process, the governing equations are described as follows:

$$\dot{m}_{St,in} - F_{out,1} \cdot [St]_1 - V_1 \cdot (k_{11}[P]_1[St]_1 + k_{21}[Q]_1[St]_1) = 0 \quad (1)$$

$$\dot{m}_{BD,in} \cdot (1-f) - F_{out,1} \cdot [BD]_1 - \\ V_1 \cdot (k_{12}[P]_1[BD]_1 + k_{22}[Q]_1[BD]_1) = 0 \quad (2)$$

$$\dot{m}_{P,in} - F_{out,1} \cdot [P]_1 - V_1 \cdot (k_{12}[P]_1[BD]_1 - k_{21}[Q]_1[St]_1) = 0 \quad (3)$$

$$\dot{m}_{P,in} + \dot{m}_{Q,in} - F_{out,1} \cdot ([P]_1 + [Q]_1) = 0 \quad (4)$$

$$F_{out,1} \cdot [St]_1 - F_{out,2} \cdot [St]_2 - V_2 \cdot (k_{11}[P]_2[St]_2 + k_{21}[Q]_2[St]_2) = 0 \quad (5)$$

$$F_{out,1} \cdot [BD]_1 + \dot{m}_{BD,in} \cdot f - F_{out,2} \cdot [BD]_2 - \\ V_2 \cdot (k_{12}[P]_2[BD]_2 + k_{22}[Q]_2[BD]_2) = 0 \quad (6)$$

$$F_{out,1} \cdot [P]_1 - F_{out,2} \cdot [P]_2 - V_2 \cdot (k_{12}[P]_2[BD]_2 - k_{21}[Q]_2[St]_2) = 0 \quad (7)$$

$$F_{out,1} \cdot ([P]_1 + [Q]_1) - F_{out,2} \cdot ([P]_2 + [Q]_2) = 0 \quad (8)$$

$$\frac{(\dot{m}_{St,in} - F_{out,1} \cdot [St]_1) \cdot Mw_{St}}{(\dot{m}_{St,in} - F_{out,1} \cdot [St]_1) \cdot Mw_{St} + (\dot{m}_{BD,in} \cdot (1-f) - F_{out,1} \cdot [BD]_1) \cdot Mw_{BD}} = \\ \frac{(F_{out,1} \cdot [St]_1 - F_{out,2} \cdot [St]_2) \cdot Mw_{St}}{(F_{out,1} \cdot [St]_1 - F_{out,2} \cdot [St]_2) \cdot Mw_{St} + (\dot{m}_{BD,in} \cdot f + F_{out,1} \cdot [BD]_1 - F_{out,2} \cdot [BD]_2) \cdot Mw_{BD}} \quad (9)$$

In these equations, [P] and [Q] are the concentrations of live polymers with the end group of styrene and butadiene, respectively. [St] and [BD] are the concentrations of monomer styrene and butadiene in the reactor. $F_{out}$ is the volumetric flow rate leaving the reactor. $\dot{m}_{p,in}$ is the mole rate for each species flowing into the reactor. Except where they appear in rate constants, the subscripts 1 and 2 correspond to the first and the second reactor. V is the reaction volume occupied by the reaction mass. $f$ is the percentage of butadiene fed into the second reactor that reflects the split ratio of butadiene to the two reactors. Mw is the molecular weight of monomer. kij stands for the propagation rate constants with the chain end of group i by adding monomer j on it. Because of the association effects in anionic polymerization, the general forms of the rate constant for styrene ($k_{11}$) and butadiene ($k_{22}$) are given by:

$$k_{11}[P] = \underbrace{(1 - f_{MR}) \left[ 1.734 \cdot 10^{12} \exp\left(-\frac{18684}{RT}\right) \cdot [P]^{1/2} \right]}_{\text{unmodified}} + \underbrace{f_{MR}\left[ 2.878 \cdot 10^{11} \exp\left(-\frac{14870}{RT}\right) \cdot [P] \right]}_{\text{modified}} \quad (10)$$

$$k_{22}[Q] = \underbrace{(1 - g_{MR}) \left[ 1.994 \cdot 10^{12} \exp\left(-\frac{19306}{RT}\right) \cdot [Q]^{1/3} \right]}_{\text{unmodified}} + \underbrace{g_{MR}\left[ 7.024 \cdot 10^{8} \exp\left(-\frac{10332}{RT}\right) \cdot [Q] \right]}_{\text{modified}} \quad (11)$$

where $f_{MR}$ (=0.5 MR) and $g_{MR}$ (=0.5 MR) are functions of modifier ratio, MR (i.e. the ratio of modifier to the initiator).

The cross-propagation rate constants $k_{12}$ and $k_{21}$ are determined from the homopolymerization rate constants and the reactivity ratios $r_{12}$ and $r_{21}$. These ratios were determined experimentally and found to be strong functions of modifier ratios. The detailed expressions were reported by Chang et al (see Chang, C.; Miller Jr., J.; Schorr, G. J. App. Polym. Sci., 1990, 39, 2395;and Chang, C.; Halasa, A. F.; Miller Jr., J.; Schorr, G.; Presented at the ACS Rubber Division Meeting, May, 1990).

Given the reactor operating conditions, the independent variables in the above equations are the concentrations of monomer species and live polymer chains in two reactors and the amount of butadiene fed to the second reactor, $f$. The total of nine variables and nine equations was solved using a commercially available software package.

The 1,3-butadiene solution was split between the first and second reactors as dictated by the above model. The styrene monomer and initiator solutions were added to the first reactor. The first and second reactor residence times for the non-oil extended polymers were 37 minutes and 58 minutes, respectively. The first and second reactor residence times used for the oil extended sample were 49 minutes and 78 minutes, respectively. The polymerization temperature used for all the Split Feed polymers was 90° C.

STA SSBR Preparation

The sodium t-amylate (STA) modified samples were prepared by addition of the STA to the first reactor at a 0.15 molar ratio to n-butyllithium. The n-butyllithium and all of the 1,3-butadiene and styrene solutions were added to the first reactor. The first and second reactor residence times for the non-oil polymers were 29 minutes and 58 minutes, respectively. The first and second reactor residence times used for the oil extended sample were 33 minutes and 66 minutes, respectively. The polymerization temperature used for the STA modified polymers was 95° C.

Unmodified SSBR Preparation

The unmodified samples were prepared by adding the n-butyllithium and all of the 1,3-butadiene and styrene solutions to the first reactor. The ranges for the first and second reactor residence times for the non-oil polymers were 36–42 minutes and 72–84 minutes, respectively. The first and second reactor residence times used for the oil extended sample were 39 minutes and 78 minutes, respectively. The polymerization temperature used for the unmodified polymers was 90° C.

Model Validation

To verify the Split Feed reactor model, experimental data was analyzed from the four Split Feed SSBRs prepared as previously described. First and second reactor conversions of 1,3-butadiene and styrene, as well as the overall monomer conversions are shown in Table II.

TABLE II

COMPARISON OF PREDICTED AND EXPERIMENTAL CONVERSIONS

| | | | Conversions (wt %) by Polymer Sample | | | |
|---|---|---|---|---|---|---|
| | | | 1a | 2a | 3a | 4a |
| Butadiene | Reactor 1 | Experimental | 96 | 95 | 93 | 93 |
| | | Model prediction | 94 | 94 | 94 | 94 |
| | Reactor 2 | Experimental | 95 | 96 | 95 | 93 |
| | | Model prediction | 95 | 96 | 96 | 96 |
| | Total | Experimental | 99 | 99 | 98 | 98 |
| | | Model prediction | 98 | 98 | 99 | 99 |
| Styrene | Reactor 1 | Experimental | 54 | 56 | 54 | 50 |
| | | Model prediction | 56 | 57 | 57 | 58 |
| | Reactor 2 | Experimental | 60 | 55 | 61 | 59 |
| | | Model prediction | 64 | 65 | 68 | 66 |
| | Total | Experimental | 82 | 80 | 82 | 79 |
| | | Model prediction | 84 | 85 | 86 | 86 |

From the data in Table II, it is observed that the model's predictions of butadiene conversions in each reactor match the experimental data quite well. In addition, the predicted conversions of styrene are in general agreement with the experimental data, but the model tends to over-predict styrene conversions as targeted bound styrene (3a) or targeted molecular weight (4a) of the polymer increases. Deviations of the model predictions from experimental data on styrene conversion may be due to poor estimates of the styrene homopolymerization rate constant in hydrocarbon solvent resulting from poor solubility of polystyrene.

Figure 1:
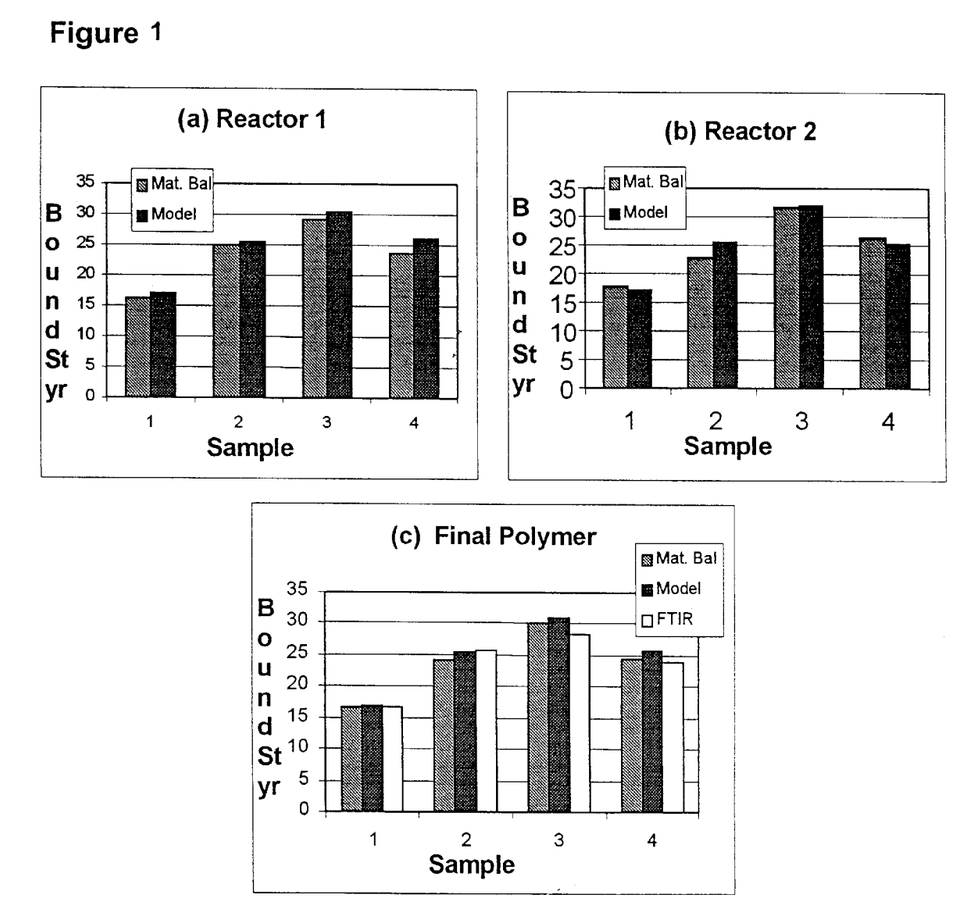
FIG. 1. Comparison of bound styrene levels as estimated by residual monomer analysis and as predicted by our model. Actual FTIR data is included for final polymer comparisons.

The weight percent bound styrene for each polymer is shown in FIGS. 1 (a), (b) and (c) by reactor and final polymer. It is observed that the model slightly over-predicts polymer bound styrene in the first reactor. In the second reactor, the model predictions are case dependent. This variability may be traced to magnification of deviations from the first reactor predictions. For the final polymer, FTIR was used to analyze the average styrene content in the polymer. In conclusion, analysis of the final polymer indicated that the model predictions match the measurements quite well with the largest error at about 9% under the predicted value.

Raw Solution SBR Properties

The three methodologies were initially compared based on the raw polymer properties of the four targeted polymers. Bound styrene levels of all the samples fell within reasonable variation (+/−3%) of targeted values with the exception of 2b which was high in styrene (30%). Aside from this sample, glass transition temperature variations seen in the polymers were largely determined based on the vinyl content of the samples. Table III summarizes styrene levels, block styrene, vinyl content, Tg, and Mw of the samples prepared in this study.

TABLE III

RAW POLYMER PROPERTIES

| | Styrene (wt %) | Block Styrene (>3S) | Vinyl (%) (wt %) | Tg (° C.) | Mw (K) |
|---|---|---|---|---|---|
| 18% Styrene | | | | | |
| Split Feed (1a) | 17.5 | 0 | 10.0 | −73.5 | 222 |
| Unmodified (1b) | 19.5 | 0.8 | 10.6 | −77.5 | 285 |
| STA (1c) | 19.3 | 0 | 16.1 | −69.9 | 258 |
| 25% Styrene | | | | | |
| Split Feed (2a) | 24.1 | 0 | 8.5 | −66.3 | 239 |
| Unmodified (2b) | 30.2 | 6.4 | 10.7 | −59.8 | 268 |
| STA (2c) | 25.9 | 0.5 | 14.5 | −62.6 | 268 |
| 30% Styrene | | | | | |
| Split Feed (3a) | 27.2 | 0 | 8.2 | −60.9 | 236 |
| Unmodified (3b) | 29.8 | 10.4 | 9.1 | −66.6 | 301 |
| STA (3c) | 30.0 | 0.8 | 13.3 | −56.1 | 247 |
| 25% Styrene OE | | | | | |
| Split Feed (4a) | 24.8 | 0 | 9.4 | −60.3 | 477 |
| Unmodified (4b) | 22.1 | 0.9 | 9.8 | −69.5 | 389 |
| STA (4c) | 24.5 | 0.3 | 16.4 | −57.7 | 636 |

As may be seen from the tabulated data, the STA modified polymerizations do not lead to the low vinyl levels found in unmodified systems, producing SSBRs with vinyl levels that are ~30–80% higher relative to the unmodified and split feed systems. As expected both the Split Feed and unmodified samples showed vinyl levels that centered around 9–10% of the total monomer. In addition, the molecular weights of the STA modified samples were generally higher for a given Mooney viscosity. Consistent with known effects of NaOR type modifiers, this might indicate a higher degree of branching for the STA modified polymers relative to the unmodified samples.

The samples were analyzed for block styrene using ozone to cleave the polymer followed by chromatographic analysis of the fragments. The results of this analysis, summarized in the second column of Table III, illustrate the effectiveness of the split feed methodology in producing random SSBR. None of the split feed samples contained any block styrene sequences greater than 3 repeat units in length. Although the STA modified polymers did contain very small amounts of block styrene in the higher styrene samples, the randomization was quite effective in that 3a contained <1% block styrene. As expected, the unmodified samples were especially blocky, containing as much as 10% block styrene in the 30% bound styrene sample, 3b. This, again, underscores the effectiveness of the split feed system in preventing block styrene by manipulating monomer concentrations as a control of monomer polymerization rates.

Physical Properties

Ultimately, the evaluation of our compounded samples in terms of tire performance properties was of paramount importance in evaluation of the three methodologies for producing random, low vinyl SSBR. Given government mandated Corporate Average Fuel Economy standards for the automobile industry, hysteresis is perhaps the most important factor in selecting elastomers for tire tread applications. Hysteretic properties of tread compounds of elastomers prepared using the three methodologies were evaluated by Goodyear-Healey Hot Rebound, Goodrich Flexometer Heat Buildup, and Autovibron tan δ. Data from these evaluations are summarized below in Table IV.

TABLE IV

HYSTERETIC ANALYSIS OF SSBR POLYMERS

| | Goodyear-Healey Hot Rebound (%) | Goodrich Flex ΔT (° C.) | Autovibron tan δ (60° C.) |
|---|---|---|---|
| 18% Styrene | | | |
| Split Feed (1a) | 75.7 | 16.6 | 0.086 |
| Unmodified (1b) | 76.3 | 20.6 | 0.097 |
| STA (1c) | 73.4 | 18.9 | 0.096 |
| 25% Styrene | | | |
| Split Feed (2a) | 78.6 | 17.2 | 0.080 |
| Unmodified (2b) | 71.2 | 18.9 | 0.116 |
| STA (2c) | 71.2 | 21.1 | 0.117 |
| 30% Styrene | | | |
| Split Feed (3a) | 76.9 | 17.8 | 0.092 |
| Unmodified (3b) | 74 | 17.8 | 0.116 |
| STA (3c) | 71.2 | 20.0 | 0.131 |
| 25% Styrene OE | | | |
| Split Feed (4a) | 76.9 | 18.3 | 0.144 |
| Unmodified (4b) | 74.6 | 16.7 | 0.126 |
| STA (4c) | 71.2 | 17.8 | 0.24 |

As may be seen from the data, in nearly all of the sample types and analytical methods, the Split Feed methodology produced the polymer having the lowest hysteresis. For example, in the case of sample type 3 (30% styrene) the Split Feed SSBR, 3a, was 30% lower in tan δ than the STA sample, 3c, and 21% lower tan δ than the unmodified SSBR sample, 3b. Heat buildup and rebound measurements of hysteresis were in general agreement with the tan δ's for sample types 1–3. However, the oil extended sample, 4a, was an exception in that the advantages of the split feed polymer were not seen in the tan δ or heat buildup measurements. Although some of the differences may be attributed to molecular weight effects, it should be noted that the rebound, heat buildup, and tan δ measurements are inconsistent across sample types 4a–c, and we are suspicious of their validity. The hysteretic performance of these samples is currently being re-evaluated.

A combination of factors is likely to contribute to results found in our hysteretic analyses. First, randomization of styrene minimizes the formation of non-elastomeric block polymer which can contribute significantly to hysteresis. Second, from comparisons of molecular weights and radii of gyration calculated from light scattering measurements, we have found that the STA samples are more branched than the Split Feed polymers. Branched polymers have more chain ends which are elastically ineffective and contribute to increased hysteresis (see Flory, P. J. Principles of Polymer Chemistry; Cornell University: Ithaca, N.Y., 1953;p.461;and Aggarwal, S. L.; Fabris, H. J.; Hargis, I. G.; Livigni, R. A. Polym. Prepr.-Am. Chem. Soc. Div. Polym. Chem., 1985, 26 (2), 3).

Thus, the hysteretic advantages of the Split Feed polymers may be traced back to their linear macrostructure and lack of block styrene. The linearity of the Split Feed polymers is a direct result of the unmodified nature of the polymerization which is carried out at relatively low temperature under isothermal operating conditions. Although the Split Feed process has the versatility to be operated adiabatically as well as isothermally, operating under isothermal conditions at lower temperatures minimizes lithium hydride elimination and reduces thermal branching resulting in a polymer with improved hysteretic properties. As expected, the unmodified sample suffers from the presence of non-elastomeric block polymer which contributes to hysteretic loss.

In light of the proliferation of high mileage warranty tires, wear performance is another important consideration for SSBR elastomers designed for tire tread applications. Though laboratory abrasion tests have notoriously poor correlation to actual tire wear testing, when such tests are consistent across samples and methods, performance trends may be predicted with a fair degree of accuracy. DIN abrasion and Pico abrasion tests were used as predictors of tire tread-wear performance. For each sample type the Split Feed SSBRs were the most resistant to abrasion averaging 16% better in volume loss from DIN abrasion and 12% better in Pico abrasion index. Although wear performance may generally be correlated back to glass transition temperature (Tg) of the polymers, in these cases the split feed polymers did not always have the lowest Tg in each series. The STA samples (having the highest Tg in Sample Types 1,3, & 4) performed the worst overall in abrasion resistance. Data are summarized below in Table V.

TABLE V

ABRASION PERFORMANCE OF SSBR POLYMERS

|  | DIN Abrasion Rel Vol Loss (mm$^3$) | Pico Abrasion Index |
|---|---|---|
| 18% Styrene |  |  |
| Split Feed (1a) | 83 | 144 |
| Unmodified (1b) | 87 | 143 |
| STA (1c) | 94 | 123 |
| 25% Styrene |  |  |
| Split Feed (2a) | 98 | 136 |
| Unmodified (2b) | 116 | 121 |
| STA (2c) | 116 | 115 |
| 30% Styrene |  |  |
| Split Feed (3a) | 102 | 126 |
| Unmodified (3b) | 111 | 117 |
| STA (3c) | 120 | 112 |
| 25% Styrene OE |  |  |
| Split Feed (4a) | 87 | 97 |
| Unmodified (4b) | 109 | 95 |
| STA (4c) | 115 | 95 |

In our evaluations, the tensile properties were essentially equal for the samples, and no advantage could be detected for one methodology over another. Whereas the Split Feed SSBRs might be expected to be deficient in tear properties due to their low vinyl microstructure and linear macrostructure, results of our tear test analysis are case dependent. Variability in tear properties also prevents us from drawing any broad conclusions as to the benefits of one methodology over another. The Split Feed SSBRs do, however, suffer from the typical tradeoffs characteristic of linear low vinyl SSBRs in terms of wet traction (as predicted by tan δ at 0° C.) versus rolling resistance. Tensile, tangent δ (0° C.), and tear data are summarized in Table VI below.

TABLE VI

MISCELANEOUS PHYSICAL DATA FROM SSBR POLYMERS

|  | Tensile (kPa) | 300% Modulus (kPa) | Elongation (%) | Autovibron tan δ (0° C.) | Tear Die (B) (B) (kN/m) |
|---|---|---|---|---|---|
| 18% Styrene |  |  |  |  |  |
| Split Feed (1a) | 19200 | 13400 | 399 | 0.119 | 43.4 |
| Unmodified (1b) | 21800 | 14000 | 442 | 0.124 | 45.7 |
| STA (1c) | 21500 | 12800 | 455 | 0.128 | 37.6 |
| 25% Styrene |  |  |  |  |  |
| Split Feed (2a) | 21200 | 14500 | 408 | 0.117 | 33.1 |
| Unmodified (2b) | 20300 | 14000 | 419 | 0.122 | 45.7 |
| STA (2c) | 20300 | 11600 | 496 | 0.138 | 47.6 |
| 30% Styrene |  |  |  |  |  |
| Split Feed (3a) | 22700 | 14800 | 438 | 0.128 | 44.8 |
| Unmodified (3b) | 22100 | 13500 | 475 | 0.116 | 48.1 |
| STA (3c) | 22800 | 12300 | 518 | 0.151 | 47.3 |
| 25% Styrene OE |  |  |  |  |  |
| Split Feed (4a) | 20900 | 8700 | 609 | 0.168 | 45.2 |
| Unmodified (4b) | 20200 | 8212 | 628 | 0.163 | 48.1 |
| STA (4c) | 21100 | 8860 | 610 | 0.188 | 41.5 |

Additional Split Feed Studies

To summarize the results of our comparison of methodologies for synthesis of random, low vinyl SSBR, we have found that the Split Feed technology clearly performs best for producing SSBR intended for tire tread applications. Furthermore, the reproducibility of the Split Feed technique has been verified in multiple preparations of sample type 2a. From our studies, it was decided to further investigate the versatility of Split Feed technology in producing high styrene and functional SSBR. Although the results discussed below are preliminary, they reflect the direction of our current efforts in exploiting the true value of the Split Feed technology.

High Styrene SSBR

In order to test the upper limits of the ability of Split Feed technology to randomize styrene, we synthesized a 35% styrene SSBR in hexane. Although the sample was approaching the upper limits of solubility for high styrene SSBR in hexanes, the polymerization proceeded well and the polymer remained in solution. Analysis of the final product using $^1$H NMR revealed that of the 35% bound styrene, only 1% was block. Vinyl content of the polymer was only 8% by $^1$H NMR. It is likely that even higher levels of styrene could be randomized if the polymerization were to be carried out in cyclohexane, a solvent better suited for high styrene SSBR.

Functional SSBRs Via Split Feed

The use of functional groups to initiate, terminate, and/or couple living anionic polymers has been studied for many years. Out of the many candidates available, several functional groups are reported to have beneficial effects in terms of improved processing, improved filler dispersion, and reduced hysteresis of rubber compounds. [18] However, the compatibility of the functional group with the polymerization process is sometimes an issue. For example, some polar modifiers have an adverse effect on coupling efficiencies, and high polymerization temperatures can lead to thermally induced termination reactions. Because the Split Feed SSBRs are produced without modifiers and under controlled temperature conditions, they are more amenable to functional termination and coupling than other processes we have considered.

In several experiments, we have tin coupled split feed n-butyl lithium initiated SSBRs to extremely high coupling efficiencies as measured by Mooney viscosity jump. For example, a low Mooney (30 base $ML_{1+4}$ (100° C.)) 25% styrene SSBR was coupled to 90 $ML_{1+4}$ (100° C.). Coupling efficiencies of this degree are indicative of a highly living polymer—a characteristic that makes the Split Feed technology an extremely versatile tool for the preparation of coupled, partially coupled, or otherwise functionally terminated polymers.

It has been reported that secondary amine initiated polymers suffer from loss of functional head groups when the living polymers are exposed to elevated process temperatures (see Lawson, D. F.; Brumbaugh, D. R.; Stayer, M. L.; Schreffler, J. R.; Antkowiak, T. A.; Saffles, D.; Morita, K.; Ozawa, Y.; Nakayama, S. Polym. Prepr.-Am. Chem. Soc. Div. Polym. Chem., 1996, 37 (2), 728). In contrast to adiabatic processes, the lower temperature isothermal conditions seen in Split Feed polymerizations allow for higher head retention in functionally initiated polymers. By controlling the temperature of the polymerization, we are better able to maximize the number of functional chain ends and consequently the effectiveness of the functional group in improving elastomer properties.

We have conducted preliminary investigations with the split feed technology using two functional initiators available on a developmental basis from FMC Corporation. These initiators, 3-(N,N-dimethylamino)-1-propyllithium (DMAPLi), and 3-(N,N-dimethylamino)-1-propyllithium 3-(t-butyldimethylsilyloxy)-1-propyllithium 3-(t-butyldimethylsilyloxy)-1-propyllithium (TBDMSPLi), were effective in initiating the synthesis of SSBR using the Split Feed technology.

In addition, the DMAPLi initiated sample was coupled using $SnCl_4$. Raw polymer properties are listed in Table VII. As may be seen from the data, although the functional initiators have some degree of Lewis basicity, they produce low vinyl solution SBR. In addition, $^1$H NMR showed no evidence of block styrene for these samples. Furthermore, the coupling efficiency of the DMAPLi initiated SSBR was quite high as measured by Mooney viscosity jump upon coupling.

TABLE VII

FUNCTIONAL SBR RAW POLYMER DATA

| Initiator | 5 | 6 |
| --- | --- | --- |
| Styrene Target (%) | 25 | 18 |
| Bound Styrene (%) | 23.5 | 16.9 |
| Vinyl (%) | 11.6 | 11.3 |
| ML 1 + 4 (base) | 30 | 49 |
| ML 1 + 4 (coupled) | 116 | N/A |
| Tg (° C.) | −64.5 | 75 |

Split Feed technology is clearly the best method tested for synthesis of random low vinyl SSBR for use in tire tread applications. As evidence, Split Feed SSBRs have the lowest block styrene and the lowest vinyl of all sample types tested, allowing us to produce the lowest glass transition temperature at a given styrene content. This is reflected in superior abrasion resistance as measured by both DIN and, Pico abrasion. In addition, due to the controlled polymerization temperature and lack of polar modifiers, the polymers do not suffer from branching which would have adverse effects on hysteretic performance. As a result, the Split Feed SSBRs consistently displayed the lowest hysteresis of the samples tested. Furthermore, in minimizing thermal branching and termination reactions typical of high temperature processes, the split feed methodology ultimately allows synthesis of polymers with higher degrees of functionality than would be possible via an adiabatic or polar modified process. And finally, by avoiding the introduction of polar modifiers in commercial operations, environmental concerns and demands on recycle and recovery processes are minimized. Low levels or the absence of polar modifiers in polymer cements of living SBR also makes coupling much more efficient.

While certain representative embodiments and details have been shown for the purpose of illustrating the subject invention, it will be apparent to those skilled in this art that various changes and modifications can be made therein without departing from the scope of the subject invention.

What is claimed is:

1. A process of synthesizing random styrene-butadiene rubber having a low level of branching and a low vinyl content which comprises: (1) continuously charging 1,3-butadiene, styrene, an organolithium initiator, and an organic solvent into a first polymerization zone, (2) allowing the 1,3-butadiene and styrene to copolymerize in the first polymerization zone to total conversion which is within the range of about 60 percent to about 90 percent to produce a polymer cement containing living styrene-butadiene chains, (3) continuously charging the polymer cement containing living styrene-butadiene chains and additional 1,3-butadiene monomer into a second polymerization zone, wherein from 20 percent to 40 percent of the total amount of 1,3-butadiene changed is charged into the second polymerization zone, (4) allowing the copolymerization to continue in the second polymerization zone to a conversion of the 1,3-butadiene monomer of at least 90 percent, wherein the total conversion of styrene and 1,3-butadiene in the second polymerization zone is limited to a maximum of 95 percent, (5) withdrawing a polymer cement of random styrene-butadiene rubber having living chain ends from the second reaction zone, (6) killing the living chain ends on the random styrene-butadiene rubber, and (7) recovering the random styrene-butadiene rubber from the polymer cement, wherein the copolymerizations in the first polymerization zone and the second polymerization zone are carried out at a temperature which is within the range of about 70° C. to about 100° C., and wherein the amount of styrene charged into the first polymerization zone is at least 5 percent more than the total amount of styrene bound into the random styrene-butadiene rubber.

2. A process as specified in claim 1 wherein killing the living chain ends on the random styrene-butadiene rubber are killed by the addition of a coupling agent.

3. A process as specified in claim 2 wherein the coupling agent is tin tetrachloride.

4. A process as specified in claim 1 wherein the amount of styrene charged into the first polymerization zone is at least 7 percent more than the total amount of styrene bound into the random styrene-butadiene rubber.

5. A process as specified in claim 4 wherein the copolymerization in the second polymerization zone results in a conversion of the 1,3-butadiene monomer of at least 95 percent.

6. A process as specified in claim 5 wherein from 25 percent to 35 percent of the total amount of 1,3-butadiene changed is charged into the second polymerization zone.

7. A process as specified in claim 6 wherein the total conversion reached in the first polymerization zone is within the range of about 75 percent to about 85 percent.

8. A process as specified in claim 7 wherein the copolymerizations in the first polymerization zone and the second polymerization zone are carried out at a temperature which is within the range of 75° C. to 95° C.

9. A process as specified in claim 8 wherein the amount of styrene charged into the first polymerization zone is at least 10 percent more than the total amount of styrene bound into the random styrene-butadiene rubber.

10. A process as specified in claim 9 wherein the copolymerization in the second polymerization zone results in a conversion of the 1,3-butadiene monomer of at least 98 percent.

11. A process as specified in claim 10 wherein from 27 percent to 33 percent of the total amount of 1,3-butadiene changed is charged into the second polymerization zone.

12. A process as specified in claim 11 wherein the copolymerizations in the first polymerization zone and the second polymerization zone are carried out at a temperature which is within the range of 80° C. to 90° C.

13. A process as specified in claim 12 wherein the organolithium initiator is an alkyl lithium compound.

14. A process as specified in claim 14 wherein the alkyl lithium compound is n-butyl lithium.

15. A process as specified in claim 1 wherein the polymerization in the first polymerization zone and the polymerization in the second polymerization zone are carried out in the absence of polar modifiers.

* * * * *